Sept. 6, 1955 R. C. BYERS 2,716,873
RESILIENT COUPLING
Filed Feb. 3, 1953
FIG. 1.
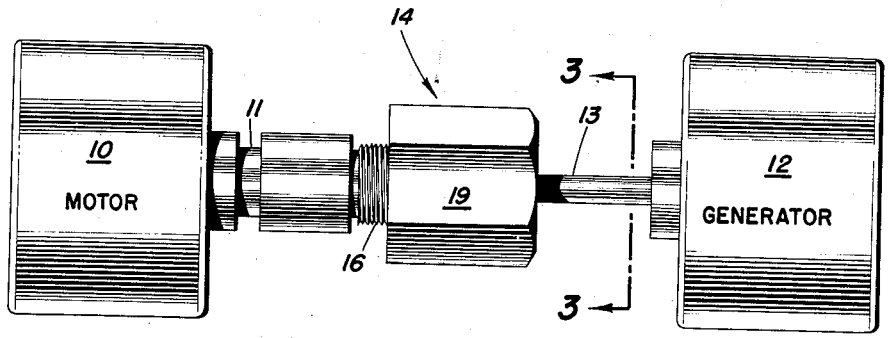
FIG. 2.
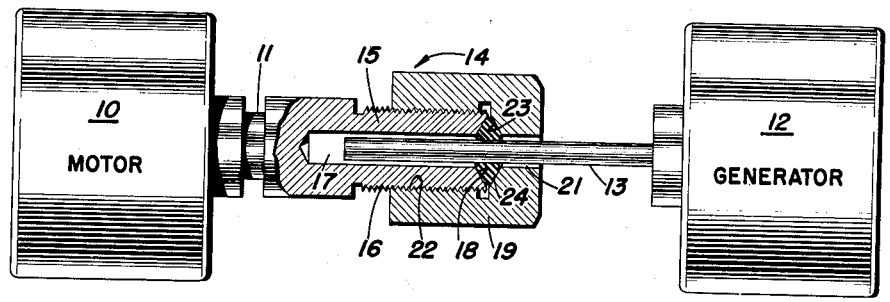
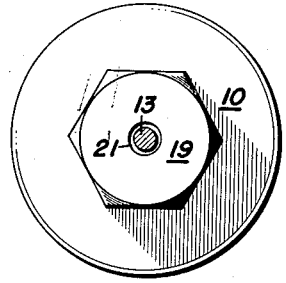
FIG. 3.
INVENTOR
ROBERT C. BYERS
BY
ATTORNEYS

United States Patent Office 2,716,873
Patented Sept. 6, 1955

2,716,873
RESILIENT COUPLING

Robert C. Byers, Kensington, Md., assignor to the United States of America as represented by the Secretary of the Navy Application February 3, 1953, Serial No. 334,800

1 Claim. (Cl. 64—11)

This invention relates generally to a resilient coupling for transmitting rotative motion from a driving shaft to a driven shaft even though said shafts are misalined and, more particularly, to a resilient coupling of the type described above which will transmit rotative motion of constant torque.

Heretofore, when driving a driven unit by a motor, it has been customary to connect the drive shaft of the motor with the driven shaft of the unit by a universal or resilient coupling so that any misalinement of the two shafts will not produce binding in the bearing of either the motor or the unit. However, in the operation of the commonly known resilient couplings, e. g. the universal joint, there is a certain amount of play involved which compensates for any misalinement of the connected shafts.

In the heretofore known resilient couplings the play caused by the couplings produced a slightly varying torque in the transmission of rotative energy to the driven shaft. There are certain operations, wherein it is desirable to have a constant torque applied to the driven unit, e. g. a generator providing a pure sine wave output for a calculating machine. In this instance the generator must be driven with a constant torque in order that a pure sine wave output may be delivered. Any variation in torque during the transmission of rotative energy to the generator will distort the wave output of the generators and preclude the accurate performance of the calculating machine.

It is accordingly an object of this invention to provide a resilient coupling which has no play in its operation.

A further object of this invention is to provide a resilient coupling which is capable of transmitting rotative motion of constant torque.

Further objects of the invention will be understood from the following detailed description, taken in conjunction with the accompanying drawing, in which:

Fig. 1 is an elevation of a coupling embodying this invention as applied between a generator and a motor;

Fig. 2 is an elevation similar to that shown in Fig. 1 with, however, the coupling shown in partial section; and Fig. 3 is a section on the line 3—3 of Fig. 1.

Referring now to the drawing, there is shown a motor 10 having a shaft 11, a generator 12 having a shaft 13, and a flexible coupling, generally designated by the numeral 14, connecting the shaft 11 of said motor to the shaft 13 of said generator.

The motor shaft 11 is provided at one end with an enlarged portion 15 formed with external threads 16 and a coaxial bore 17 for loosely receiving the generator shaft 13. The outer extremity of the enlarged portion 15 has a conical seat 18.

A coupling nut 19 is constructed with a coaxial bore 21 for freely admitting the generator shaft 13 and a threaded counter-bore 22 for engaging the external threads 16 of the enlarged portion 15. The end of the counter-bore 22 is shaped to define a conical seat 23.

The coupling is assembled as follows. After first slipping the coupling nut 19 on the generator shaft 13, a resilient ring 24 is slipped on. The generator shaft 13 is then inserted into the coaxial bore 17 in the enlarged portion 15 of the motor shaft 11. Then, the coupling nut 19 is drawn up on the threads 16 of the enlarged portion 15, thus compressing the resilient ring 24 between the conical seats 18 and 23 into tight driving engagement with both the enlarged portion 15 of the motor shaft 11 and the generator shaft 13. Inasmuch as the resilient ring 24 frictionally engages the generator shaft 13 about its entire periphery, no play can occur even though said generator shaft is misalined with the motor shaft 11.

It should be understood, of course, that both the enlarged portion 15 and the coupling nut 19 are preferably threaded in a direction opposite to the direction of rotation of the motor 10, so that loosening of said nut on said enlarged portion will not occur.

Obviously many modifications and variations of this invention can be made in light of the above teachings. Therefore, it is to be understood that within the scope of the appended claim this invention may be practiced otherwise than as specifically described.

What is claimed is:

A resilient coupling for operatively connecting a pair of shafts, comprising an externally threaded member connectable to and forming an integral part of one of said shafts when connected thereto, said member having an axial bore loosely receiving a substantial portion of the end of the other of said shafts in spaced relation thereto, and a diverging cone-shaped seat at one end, the axis of said cone-shaped seat and the axis of said first shaft coinciding with one another, a nut-like member having a coaxial bore for loosely admitting the end of said other shaft and a threaded counter-bore ending in a cone-shaped seat, said nut-like member threadedly engaging said externally threaded member to bring the two of said cone-shaped seats face to face, and a resilient ring on said other shaft and between said cone-shaped seats, said ring being compressed into tight driving engagement with said externally threaded member and said other shaft whereby rotary motion of constant torque is obtained.

References Cited in the file of this patent

UNITED STATES PATENTS 2,247,163    Bradley _____ June 24, 1941